United States Patent [19]
Ohkura et al.

[11] Patent Number: 6,002,187
[45] Date of Patent: Dec. 14, 1999

[54] BICYCLE ELECTRICITY GENERATOR AND A METHOD OF ATTACHING THE ELECTRICITY GENERATOR TO A BICYCLE

[75] Inventors: Kenichi Ohkura; Hiroyasu Yamada; Hiroshi Takemoto, all of Saitama-ken, Japan

[73] Assignee: Pioneer Precision Machinery Corporation, Tokyo, Japan

[21] Appl. No.: 08/883,232

[22] Filed: Jun. 26, 1997

[30] Foreign Application Priority Data

Jul. 22, 1996 [JP] Japan ................................. 8-192561

[51] Int. Cl.$^6$ ........................................................ H02K 7/00
[52] U.S. Cl. .......................................... 310/67 A; 310/67 R
[58] Field of Search ................................ 310/51, 112, 91, 310/67 A, 67 R, 75 C

[56] References Cited

U.S. PATENT DOCUMENTS

| | | | |
|---|---|---|---|
| 2,104,707 | 1/1938 | Rawlings | 310/75 C |
| 4,191,988 | 3/1980 | Kumakura | 362/72 |
| 4,617,484 | 10/1986 | Buijsen | 310/51 |
| 4,677,328 | 6/1987 | Kumakura | 310/67 R |
| 4,860,176 | 8/1989 | Bauwens et al. | 362/72 |
| 5,115,159 | 5/1992 | Takamiya et al. | 310/67 A |
| 5,597,242 | 1/1997 | Beeler | 384/517 |
| 5,600,191 | 2/1997 | Yang | 310/67 R |

FOREIGN PATENT DOCUMENTS

| | | |
|---|---|---|
| 1112759 | 3/1956 | France . |
| 1274615 | 2/1962 | France . |
| WO 83/03584 | 10/1983 | WIPO . |

*Primary Examiner*—Nestor Ramirez
*Assistant Examiner*—Tran N Nguyen
*Attorney, Agent, or Firm*—Nikaido Marmelstein Murray & Oram, LLP.

[57] ABSTRACT

A bicycle electricity generator is provided including an annular stator and an annular rotor, both of which are coaxially mounted on a bicycle wheel axle in a position between a bicycle wheel hub and a fork, wherein the stator is fixed either on the wheel axle or on the fork; the rotor is fixed in connection with the bicycle wheel hub, the rotor's rotating center being coincident with the rotating center of the bicycle wheel; a rotating force transmitting member made of a resilient material for transmitting a rotating force from the hub to the rotor is provided in a position between the rotor and the hub so as to form frictional engagement with both the rotor and the hub, wherein either an auxiliary transmitting structure is provided for auxiliarily transmitting a rotating force from the bicycle wheel hub to the rotor and wherein one portion of the auxiliary transmitting structure is fixedly secured with respect to the rotor and another portion of the auxiliary transmitting member is fixedly secured with respect to the bicycle wheel or one or more spacers are disposed between the rotor and the rotating force transmitting member and the one or more spacers are in frictional engagement with the rotor and the rotating force transmitting member.

2 Claims, 7 Drawing Sheets

BICYCLE ELECTRICITY GENERATOR AND A METHOD OF ATTACHING THE ELECTRICITY GENERATOR TO A BICYCLE

BACKGROUND OF THE INVENTION

The present invention relates to a bicycle electricity generator and a method of attaching the electricity generator to a bicycle.

A bicycle is usually equipped with an electricity generator which generates electricity by rotating a bicycle wheel so as to supply the electricity to a lighting device. Japanese Patent Application Laid-open No. 63-502652 and Japanese Utility Model Publication No. 1-23900 have disclosed a bicycle electricity generator which is attached to the axle of a bicycle wheel.

A conventional bicycle electricity generator, which is disclosed in Japanese Patent Application Laid-open No. 63-502652, comprises a stator mainly consisting of a coil, and a rotor mainly consisting of a magnet, both of which are combined together by means of a bearing. In more detail, the stator is fixed on a fork of a bicycle, whilst the rotor is fixed onto spoke members of a bicycle wheel. While the bicycle is running, the rotation of a bicycle wheel will cause the rotor to rotate, thereby enabling the generator to produce electricity.

Another conventional bicycle electricity generator, which is disclosed in Japanese Utility Model Publication No. 1-23900, also comprises a stator and a rotor, both of which are combined together by means of a bearing. In more detail, the stator is fixed on the axle of a bicycle wheel, whilst the rotor is fixed on a hub which is freely rotatable with respect to the wheel axle and holds a number of spokes. While the bicycle is running, the rotation of a hub will cause the rotor to rotate, thereby enabling the generator to produce electricity.

However, in the bicycle electricity generator disclosed in Japanese Patent Application Laid-open No. 63-502652, since the rotor is fixed onto spoke members (thin wire-like members) of a bicycle wheel, there is only a low strength in the fixation of the rotor, resulting in a problem that the rotor is apt to fall off the spoke members.

On the other hand, in the bicycle electricity generator disclosed in Japanese Utility Model Publication No. 1-23900, although the rotor is fixed on a hub, sometimes this kind of fixation is difficult because of the particular specifications of bicycles different. For instance, the distance between a hub and a fork will be different in different types of bicycles. In some extreme cases, a distance between a hub and a fork is too small or too large, making it impossible for a bicycle electricity generator to be installed on the axle of a bicycle wheel.

SUMMARY OF THE INVENTION

It is an object of the present invention to provide an improved bicycle electricity generator and a method of attaching the electricity generator to a bicycle, so as to solve the above-mentioned problems peculiar to the above-mentioned prior art.

According to one aspect of the present invention, there is provided a bicycle electricity generator having an annular stator and an annular rotor, both of which are coaxially mounted on a bicycle wheel axle in a position between a bicycle wheel hub and a fork. Here, the stator is fixed either on the wheel axle or on the fork. The rotor is fixed in connection with the hub, the rotor's rotating center is coincident with the rotating center of the bicycle wheel. The rotating force transmitting member for transmitting a rotating force from the hub to the rotor is provided in a position between the rotor and the hub so as to form frictional engagement with both the rotor and the hub.

Further, an auxiliary transmitting structure is provided for auxiliarily transmitting a rotating force from the bicycle wheel hub to the rotor.

Moreover, one or more spacers are disposed between the rotor and the rotating force transmitting member, one or two spacers are in frictional engagement with the rotor and the rotating force transmitting member.

According to another aspect of the present invention, there is provided a method for attaching a bicycle electricity generator to a bicycle. In this method, a bicycle electricity generator including an annular stator and an annular rotor is coaxially mounted on a bicycle wheel axle in a position between a hub and a fork. Said method comprises: inserting a rotating force transmitting member on the wheel axle, said rotating force transmitting member being adapted to transmit a rotating force from the hub to the rotor; inserting the bicycle electricity generator on the wheel axle; fixing the annular stator either on the wheel axle or on the fork; fastening a nut at one end of the wheel axle, thereby enabling the rotor to frictionally engage with the rotating force transmitting member.

Further, an auxiliary transmitting structure is provided for auxiliarily transmitting a rotating force from the hub to the rotor.

Moreover, one or more spacers are disposed between the rotor and the rotating force transmitting member, one or two spacers are in frictional engagement with the rotor and the rotating force transmitting member.

The above objects and features of the present invention will become more understood from the following description with reference to the accompanying drawings.

BRIEF DESCRIPTION OF DRAWINGS

FIG. 3a is a front view showing a spacer.

FIG. 3b is a cross sectional view showing the spacer of FIG. 3a.

FIG. 3c is a back view showing the spacer of FIG. 3a.

FIG. 4a is an explanatory exploded view showing a bicycle electricity generator according to a third embodiment of the present invention.

FIG. 4b is an explanatory view showing a part of the bicycle electricity generator of FIG. 4a.

FIG. 4c is a perspective view showing an engaging member used in the bicycle electricity generator of FIG. 4a.

FIG. 6a is a side view indicating a bicycle electricity generator according to a fifth embodiment of the present invention.

FIG. 6b is a front view indicating the bicycle electricity generator of FIG. 6a.

FIG. 7a is a side view indicating a bicycle electricity generator according to a sixth embodiment of the present invention.

FIG. 7b is a front view indicating the bicycle electricity generator of FIG. 7a.

FIG. 8a is a front view indicating a bicycle electricity generator according to a seventh embodiment of the present invention.

FIG. 8b is a side view indicating the bicycle electricity generator of FIG. 8a.

FIG. 8c is a front view showing a connecting member for use in the bicycle electricity generator of FIG. 8a.

DETAILED DESCRIPTION OF THE PREFERRED EMBODIMENTS

Figure 1:
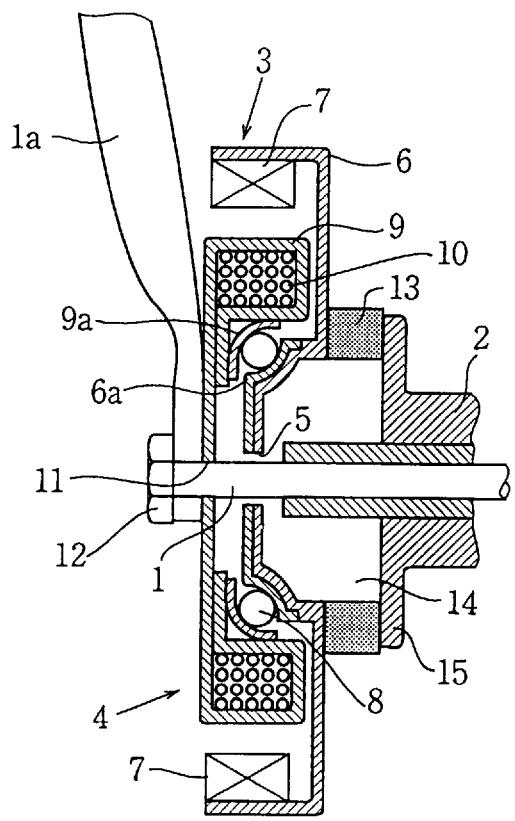
FIG. 1 is a cross sectional view indicating a bicycle electricity generator according to a first embodiment of the present invention.

Referring to FIG. 1, a bicycle electricity generator (hereinafter simply referred to as generator) according to a first embodiment of the present invention is disposed in a position between a fork 1a and a hub 2 of a bicycle. As shown in FIG. 1, the generator comprises an annular rotor 3 and an annular stator 4. The annular stator 4 is received in the annular inner space of the annular rotor 3. In detail, the rotor 3 includes a rotor case 6 having a central hole 5 through which a wheel axle 1 is inserted. One side (to the left of FIG. 1) of the rotor case 6 is opened. An annular magnet 7 is fixed around the inner circumferential surface of the rotor case 6. The rotor 3 is mounted on the axle 1 such that it can freely rotate about the axle 1. In particular, the inner circumferential surface of the hole 5 is made of a resin material (such as a polyamide resin) capable of offerring a slidable surface, so that it can serve to act as a bearing.

The rotor 3 is fixed in connection with the hub 2, with its rotating center coincident with that of the axle 1. Specifically, a rotating force transmitting member 13 having an annular shape and made of a resilient material is forced into a position between the rotor 3 and the hub 2, so that a driving force from the hub 2 may be transmitted to the rotor 3 through the member 13. In more detail, the rotating force transmitting member 13 has a central hole 14 through which the axle 1 is inserted. One end face of the member 13 is in contact with a flange portion 15 of the hub 2, the other end face of the member 13 is in contact with the rotor case 6. Here, the member 13 is made of a rubber such as a normal butadiene rubber.

The stator 4 includes a coil 10 and a metal yoke 9 enclosing the coil 10. The metal yoke 9 is formed with a central hole 11 through which the axle 1 is inserted. In fact, the metal yoke 9 is secured on the axle 1 so that it is not rotatable about the axle 1.

Between the rotor 3 and the stator 4 there is interposed a bearing 8, so that the rotor 3 may smoothly rotate around the stator 4. In practice, the bearing 8 includes a bearing cup 9a secured on the metal yoke 9 and another bearing cup 6a secured on the rotor case 6.

Referring again to FIG. 1, after the rotating force transmitting member 13, the generator (including the rotor 3 and the stator 4) and the fork 1a are attached to the axle 1, a nut 12 is fastened at the outer end of the axle 1. In this way, the stator 4 may be firmly fixed together with the fork 1a on the axle 1, and the rotor 3 is kept integrate with the member 13, so that the rotor 3 can freely rotate (with respect to the stator 4) together with the hub 2 and the member 13.

As is understood from the above description, since the rotating force transmitting member 13 is provided between the rotor 3 and the hub 2, even if a distance between the hub 2 and the fork 1a is different from one bicycle to the other, the generator (3, 4) may be easily installed in various types of bicycles by absorbing size differences with the use of the member 13 having a sufficient resilience.

Further, since the member 13 having a sufficient resilience is provided between the rotor 3 and the hub 2, a vibration from a running wheel (not shown) may be absorbed by the member 13. Thus, the generator (3, 4) may be protected from damage possibly caused by such a vibration.

Figure 2:
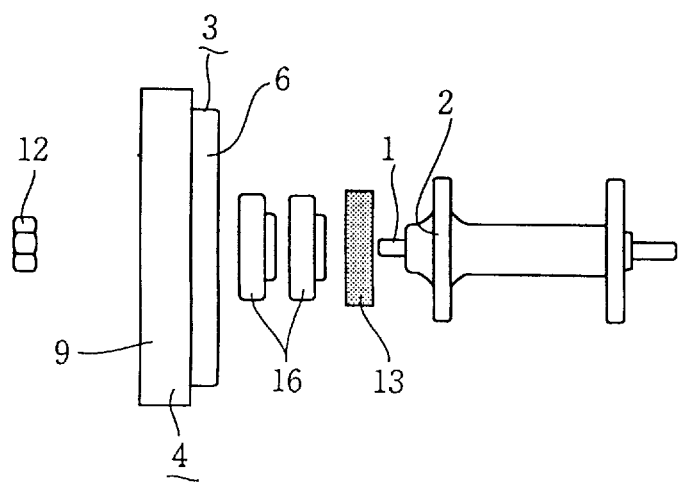
FIG. 2 is an exploded side view indicating a bicycle electricity generator according to a second embodiment of the present invention.

FIG. 2 shows a bicycle electricity generator according to a second embodiment of the present invention, which is suitable to be installed in a bicycle involving a relatively large distance between the hub 2 and the fork (not shown). As shown in FIG. 2, there are two spacers (16, 16) provided between the rotating force transmitting member 13 and the generator (3, 4). However, the number of spacers may be changed in accordance with an actual distance between the hub 2 and the fork.

Figure 3:
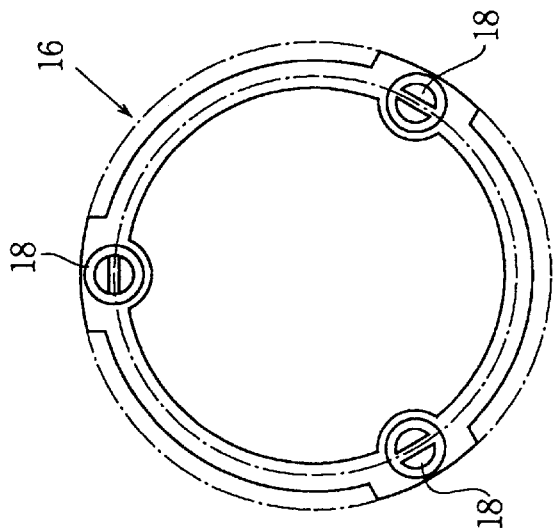
Figure 3:
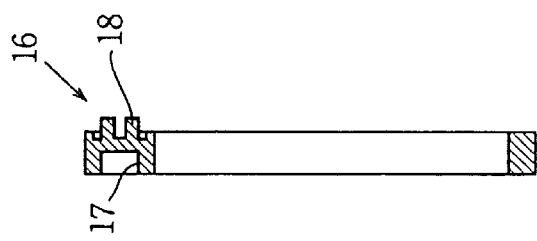
Figure 3:
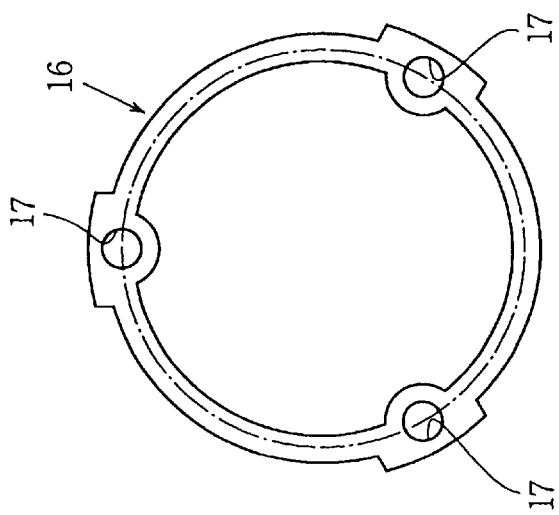

As shown in FIGS. 3a–3c, each spacer 16 has an annular ring-like shape. A plurality of recess portions 17 are formed circumferentially on one side of each spacer 16. A plurality of projections 18 are formed circumferentially on the opposite side of the spacer 16, with each projection 18 aligned with each recess portion 17. Each spacer 16 may be made of a resin using an injection molding machine.

Referring again to FIG. 2, each spacer 16 is attached to the axle 1 with its projections 18 facing the rotating force transmitting member 13. In this way, after the member 13, the two spacers (16, 16), the generator (3, 4) and the fork member (not shown) are attached to the axle 1, followed by fastening a nut 12 at the end of the axle 1, a first spacer 16 will have its projections 18 embedded in the resilient member 13, a second spacer 16 will have its projections 18 embedded in the recess portions 17 of the first spacer 16. Thus, the rotating movement of the hub 2 may be effectively transmitted to the rotor 3 through the member 13 and the two spacers (16, 16). Further, projections similar to the above projections 18 nay also be formed on the outer end face of the rotor case 6, and engage the recess portions 17 of the second spacer 16. Since the rotor case 6 may be made of the same resin as the spacers 16, using the same injection molding machine, it is relatively easy to form such projections on the outer end face of the rotor case 6.

FIGS. 4a–4c show a bicycle electricity generator according to a third embodiment of the present invention. As shown in FIG. 4a, a male engaging member 21 is secured on the outer end face of the rotor case 6. The male engaging member 21 has a support portion 22 fixed on the rotor case 6, and a projection 23 formed on the support portion 22. On the other hand, as shown in FIG. 4b, a female engaging member 24 is secured between two spokes 20, 20 (fixed on the hub 2) of a bicycle wheel. Referring to FIG. 4c, the female engaging member 24 is formed by attaching a central rubber member 26 onto a metal base plate, and has a hole 27 formed in the rubber member 26 for receiving the projection 23 of the male engaging member 21. Further, the female engaging member 24 has a pair of small holes 28, 28. When the female engaging member 24 is to be fixed between two spokes 20, 20, the rubber member 26 shall be pressed so as to be embeded in a position between the two spokes 20, 20. After two holes (not shown) of the male engaging member 21 are aligned with the two holes 28, 28 of the female engaging member 24, screws are inserted through these holes, followed by fastening a nut at the end of each screw, thereby firmly fixing together the male engaging member 21 and the female engaging member 24.

Figure 4:
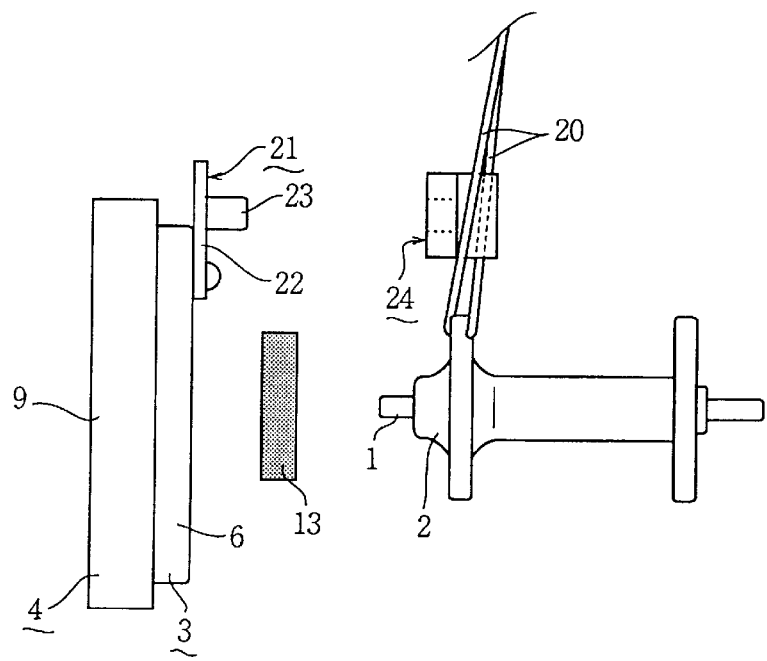
Figure 4:
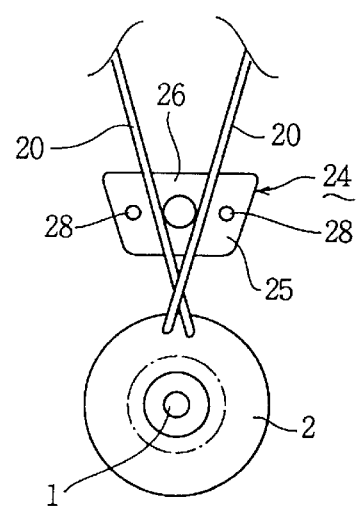
Figure 4:
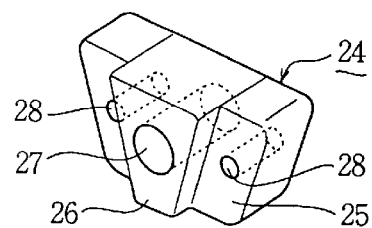

The engagement of the male engaging member 21 with the female engaging member 24, which forms an auxiliary transmitting structure, can offer at least the following effects. That is, since the rotating force transmitting member 13 sometimes exhibits too large or too small a resilience, it will sometimes be difficult for the rotor 3 to obtain the desired driving force from the hub 2. In order to avoid such a problem, the male engaging member 21 and the female engaging member 24 are provided in a manner as shown in FIG. 4. In this way, a rotating force from the hub 2 can be effectively transmitted to the rotor 3 through the engagement of the male engaging member 21 with the female engaging member 24. Thus, the rotor 3 and the hub 2 can be combined together in a more exact and stabilized manner than the above prior art (Japanese Utility Model Publication No. 1-23900) where a rotor and a hub are directly combined together without using any auxiliary transmitting structure.

In the embodiment shown in FIG. 4, since a rotating force is transmitted from the hub 2 to the rotor 3 not only through the rotating force transmitting member 13 but also through the engagement of the male engaging member 21 with the female engaging member 24, it may be expected to eliminate a vibration and a noise which possibly occur when the rotating force is transmitted from the hub 2 to the rotor 3. Further, a combining strength between the rotor 3 and the hub 2 becomes stronger than the above prior art (Japanese Utility Model Publication No. 1-23900).

Figure 5:
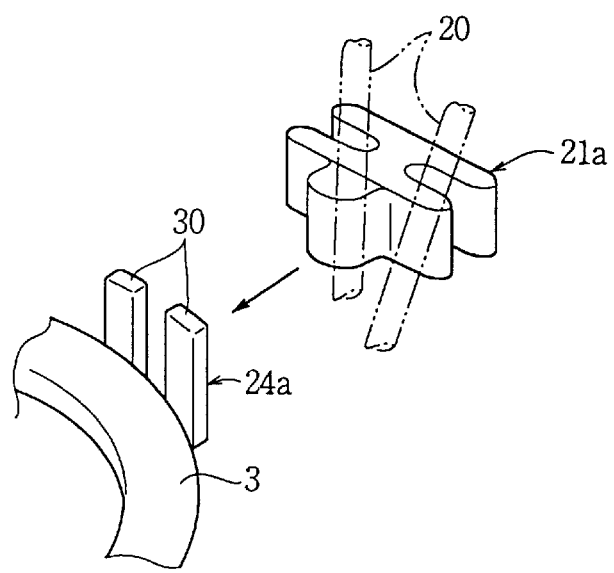
FIG. 5 is a perspective view showing an important part of a bicycle electricity generator according to a fourth embodiment of the present invention.

FIG. 5 shows a fourth embodiment of the present invention. As shown in FIG. 5, a male engaging member 21a is fixed between two spokes (20, 20). A female engaging member 24a consisting of two plates (30, 30) is secured on the rotor 3. The engagement of the male engaging member 21a with the female engaging member 24a, which forms an auxiliary transmitting structure, may be used in the same manner as in the above third embodiment, and can offer effects similar to those in the third embodiment.

Figure 6:
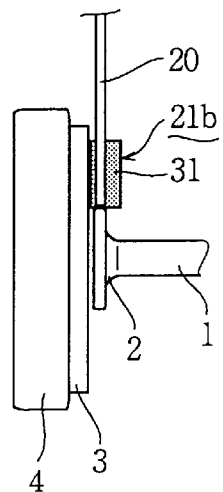
Figure 6:
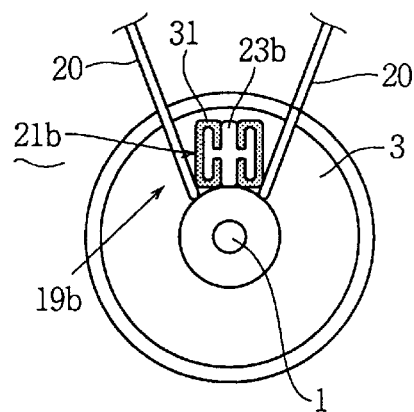

FIGS. 6a and 6b show a fifth embodiment of the present invention. As shown in FIGS. 6a and 6b, a specifically shaped member 23b is secured on the outer end face of the rotor 3. The member 23b has a particular shape as shown in FIG. 6b and is covered by a rubber material 31, thus forming an engaging member 21b. Further, as shown in FIG. 6b, the engaging member 21b is embedded between two spokes 20, 20. The other parts of the embodiment shown in FIGS. 6a and 6b are similar to those in the third embodiment, offerring effects similar to those in the third embodiment.

Figure 7:
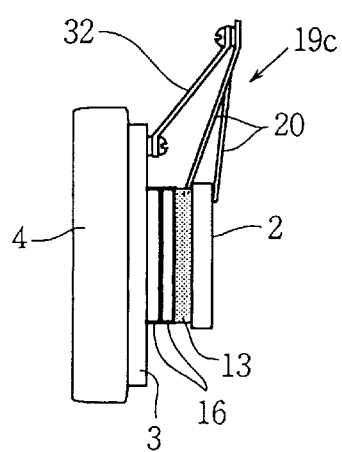
Figure 7:
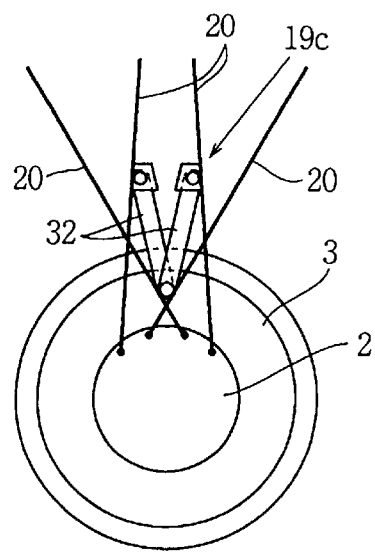

FIGS. 7a and 7b show a sixth embodiment of the present invention. As shown in FIGS. 7a and 7b, an auxiliary transmitting structure 19c has a pair of plate pieces 32, 32 both of which are secured together at their ends on the outer end face of the rotor 3. The other ends of the plate pieces 32, 32 are fixed at a position between two spokes 20, 20.

As shown in FIG. 7a, each of the above plate pieces 32, 32 may be bent, so that the plate pieces 32, 32 may be easily fixed on the outer end face of the rotor 3, irrespective of space distance between the hub 2 and the rotor 3. The other parts of the embodiment shown in FIGS. 7a and 7b are similar to those in the second or third embodiment, offerring effects similar to those in the second or third embodiment.

Figure 8:
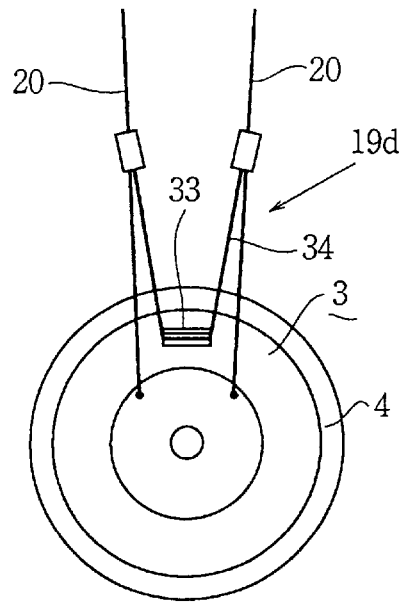
Figure 8:
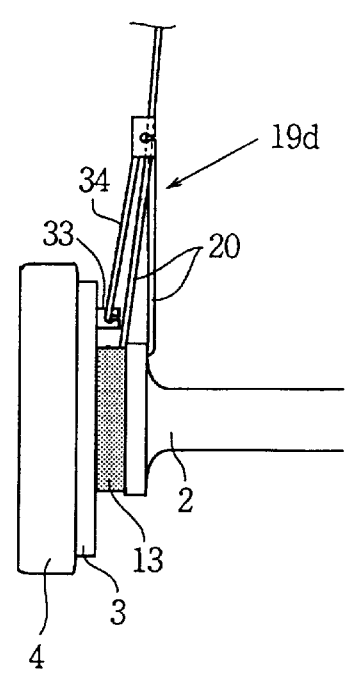
Figure 8:
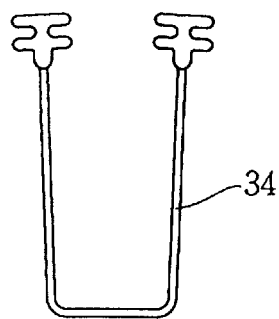

FIGS. 8a–8c show a seventh embodiment of the present invention. As shown in FIGS. 8a–8c, an engaging piece 33 is secured on the outer end face of the rotor 3. A connecting member 34, having both ends thereof connected with two spokes 20, 20, is connected to the engaging piece 33. The connecting member 34 is made of a metal wire having a generally "U" shape. After the two ends of the connecting member 34 are formed into a shape shown in FIG. 8c, the connecting member 34 may easily engage with the spokes 20, 20 at such two ends thereof. When the connecting member 34 is caused to engage with the engaging piece 33, the engaging member 33 is deformed so that the lower end of the connecting member 34 is allowed to be pressed into the engaging piece 33. In this way, the engaging piece 33 and the connecting member 34 together form an auxiliary transmitting structure 19d. The other parts of the embodiment shown in FIGS. 8a–8c are similar to those in the third embodiment, offerring effects similar to those in the third embodiment.

The operation for attaching one of the above electricity generators to a bicycle will be described below.

At first, the nut 12 is removed from the axle 1. Then, one of the two forks 1a is removed therefrom. Afterwards, a resilient rotating force transmitting member 13 is mounted onto the axle 1 with the axle 1 passing through the central hole of the member 13. Subsequently, a desired number of spacers 16 are amounted onto the axle 1 (where the spacers 16 are necessary) in the same manner when the member 13 is mounted. After that, the rotor 3 and the stator 4 are mounted onto the axle 1, with the axle 1 passing through the central hole 5 of the rotor case 6 and the central hole 11 of the stator yoke 9. If the above auxiliary transmitting structure is to be used, such auxiliary transmitting structure shall be fixed onto the rotor case 6 and the spokes 20. After the above auxiliary transmitting structure has been fixed, or if the above auxiliary transmitting structure is not used, the fork 1a shall be attached on to the axle 1. Finally, the nut 12 is fastened at the end of the axle 1. At this point, the rotating force transmitting member 13 will be in a compressed condition, so that a rotating driving force may be effectively transmitted from the hub 2 to the rotor 3.

Figure 9:
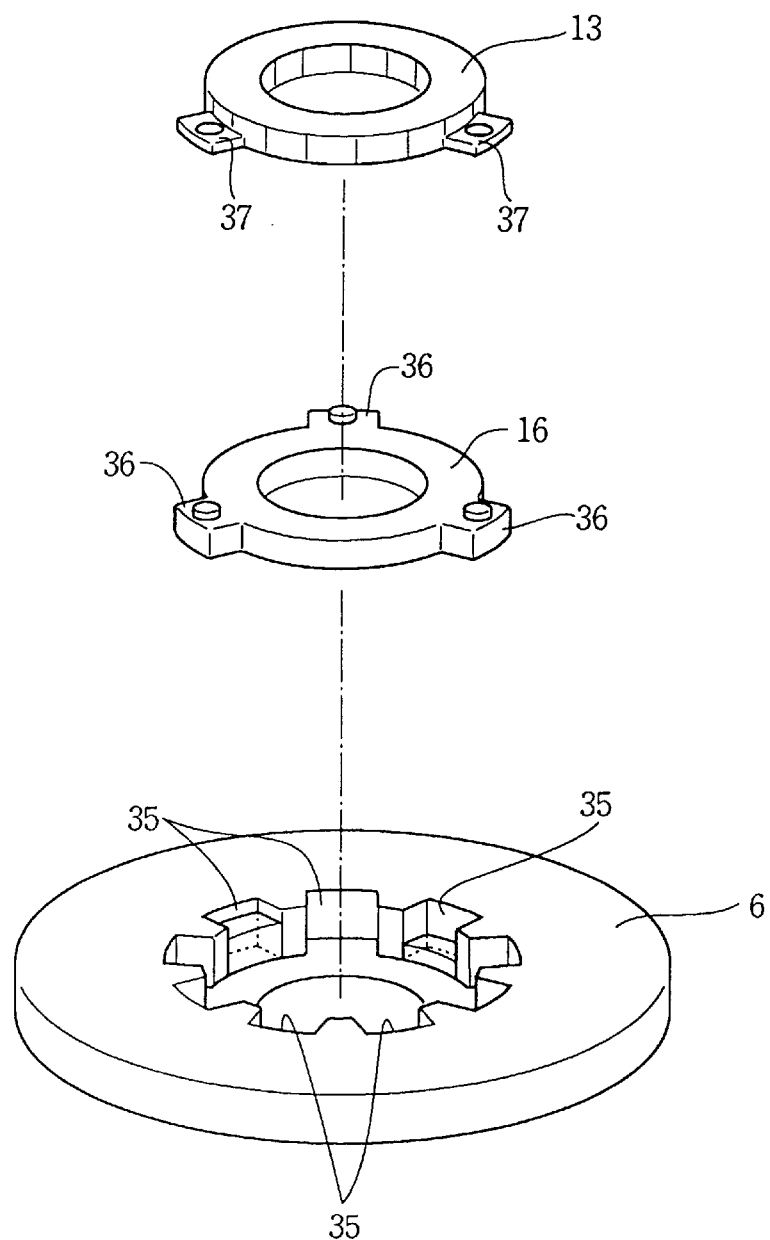
FIG. 9 is an exploded view showing an assembling condition of a bicycle electricity generator according to the present invention.

Referring to FIG. 9, in order to more easily attach an electricity generator to a bicycle, a rotor case 6, a spacer 16 and a rotating force transmitting member 13 may be formed into specific shapes as shown in the drawing. Namely, the rotor case 6 is formed with a plurality of recess portions 35 on its inner circumferential surface. The spacer 16 is formed with a plurality of projections 36 on its outer circumferential surface, the rotating force transmitting member 13 is formed with a plurality of projections 37 on its outer circumferential surface. In assembling, the projections 36 of the spacer 16 and the projections 37 of the rotating force transmitting member 13 are caused to engage the recess portions 35 of the rotor case 6. Meanwhile, the projections 18 (FIG. 3b) of the spacer 16 are caused to engage recess portions (not show) of the transmitting member 13. Thus, the rotor case 6, the spacer 16 and the rotating force transmitting member 13 are combined together to form an integral body.

Further, there may be several kinds of spacers 16 having different thicknesses, so that a fine adjustment in assembling thickness may be achieved. In addition, the projections 36 of spacers 16 of different thickness have different shapes. Also, the recess portions 35 of the rotor case 6 involve several different shapes, each type of recess portions being arranged with equal intervals around the inner circumferential wall thereof. If a spacer 16 having a desired thickness is selected and the projections 36 thereof are caused to engage only a selected type of recess portions 35, assembly will become much easier.

Moreover, as shown in FIG. 9, the recess portions 35 of the rotor case 6 have different depths, each kind being arranged with equal intervals around the inner circumferential wall. By engaging the projections 36 of the spacer 16 into the recess portions 35 of a selected depth, the rotating force transmitting member 13 may be under an optimum compressed condition.

During the above assembling operation, a distance from the flange portion 15 of the hub 2 to the outer end of the axle 1 is measured in advance, so that a spacer 16 having an appropriate thickness may be selected in accordance with the measured results, thereby renderring the rotating force transmitting member 13 to be under an optimum compressed condition.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A bicycle electricity generator comprising an annular stator and an annular rotor, both of which are coaxially mounted on a bicycle wheel axle in a position between a bicycle wheel hub and a fork, wherein:

the stator is fixed either on the wheel axle or on the fork;

the rotor is fixed in connection with the bicycle wheel hub, the rotor's rotating center being coincident with the rotating center of the bicycle wheel;

a rotating force transmitting member made of a resilient material for transmitting a rotating force from the hub to the rotor is provided in a position between the rotor and the hub so as to form frictional engagement with both the rotor and the hub, wherein an auxiliary transmitting structure is provided for auxiliarily transmitting a rotating force from the bicycle wheel hub to the rotor and wherein one portion of the auxiliary transmitting structure is fixedly secured with respect to the rotor and another portion of the auxiliary transmitting member is fixedly secured with respect to the bicycle wheel.

2. A bicycle electricity generator comprising an annular stator and an annular rotor, both of which are coaxially mounted on a bicycle wheel axle in a position between a bicycle wheel hub and a fork, wherein:

the stator is fixed either on the wheel axle or on the fork;

the rotor is fixed in connection with the bicycle wheel hub, the rotor's rotating center being coincident with the rotating center of the bicycle wheel;

a rotating force transmitting member made of a resilient material for transmitting a rotating force from the hub to the rotor is provided in a position between the rotor and the hub so as to form frictional engagement with both the rotor and the hub, wherein one or more spacers are disposed between the rotor and the rotating force transmitting member and the one or more spacers are in frictional engagement with the rotor and the rotating force transmitting member.

* * * * *